United States Patent [19]

Fujii

[11] 4,143,587
[45] Mar. 13, 1979

[54] APPARATUS FOR DEFORMING CORRUGATED FIBERBOARD

[75] Inventor: Toshihiko Fujii, Yokohama, Japan

[73] Assignee: Nissan Motor Company, Limited, Yokohama, Japan

[21] Appl. No.: 817,434

[22] Filed: Jul. 20, 1977

[30] Foreign Application Priority Data

Jul. 22, 1976 [JP] Japan .............................. 51-97806[U]

[51] Int. Cl.² .................... B30B 15/34; B31B 43/00
[52] U.S. Cl. .................................. 93/1 D; 93/51 R; 93/59 MT; 156/494; 156/581; 156/583; 425/395; 425/408; 425/DIG. 110
[58] Field of Search ..... 425/395, 394, 408, DIG. 110; 156/581, 583, 443, 494, 580; 100/93 P; 93/1 D, 36.3, 49 R, 51 R, 59 MT

[56] References Cited

U.S. PATENT DOCUMENTS

| | | | |
|---|---|---|---|
| 2,255,116 | 9/1941 | Helmstaedter | 425/394 X |
| 2,270,187 | 1/1942 | Dulmage | 425/394 X |
| 2,797,179 | 6/1957 | Reynolds et al. | 156/581 |
| 3,231,449 | 1/1966 | Tomson | 156/583 |
| 3,347,733 | 10/1967 | Elver | 156/583 |
| 3,800,682 | 4/1974 | Gournelle | 93/59 MT |
| 3,915,775 | 10/1975 | Davis | 156/494 X |

*Primary Examiner*—Michael G. Wityshyn

[57] ABSTRACT

Apparatus for inelastically deforming an initially flat blank of a corrugated fiberboard, comprising two die blocks movable relative to each other and having complementarily convex and concave pressing surfaces and blank retaining means adapted to clamp opposite marginal portions of a blank of a corrugated fiberboard being warped between the die blocks with the marginal portions urged sidewise inboardly of the die blocks, the blank retaining means being operative to restrain the blank from being moved in a direction parallel with the marginal portions but to allow the marginal portion of the blank to move the marginal portions of the blank sidewise inboardly of the die blocks in a direction perpendicular to the marginal portions so that not only production of creases in curved portions of the blank but production of fissures as would be caused if the blank is excessively stretched between the opposite marginal portions of the blank are precluded.

11 Claims, 8 Drawing Figures

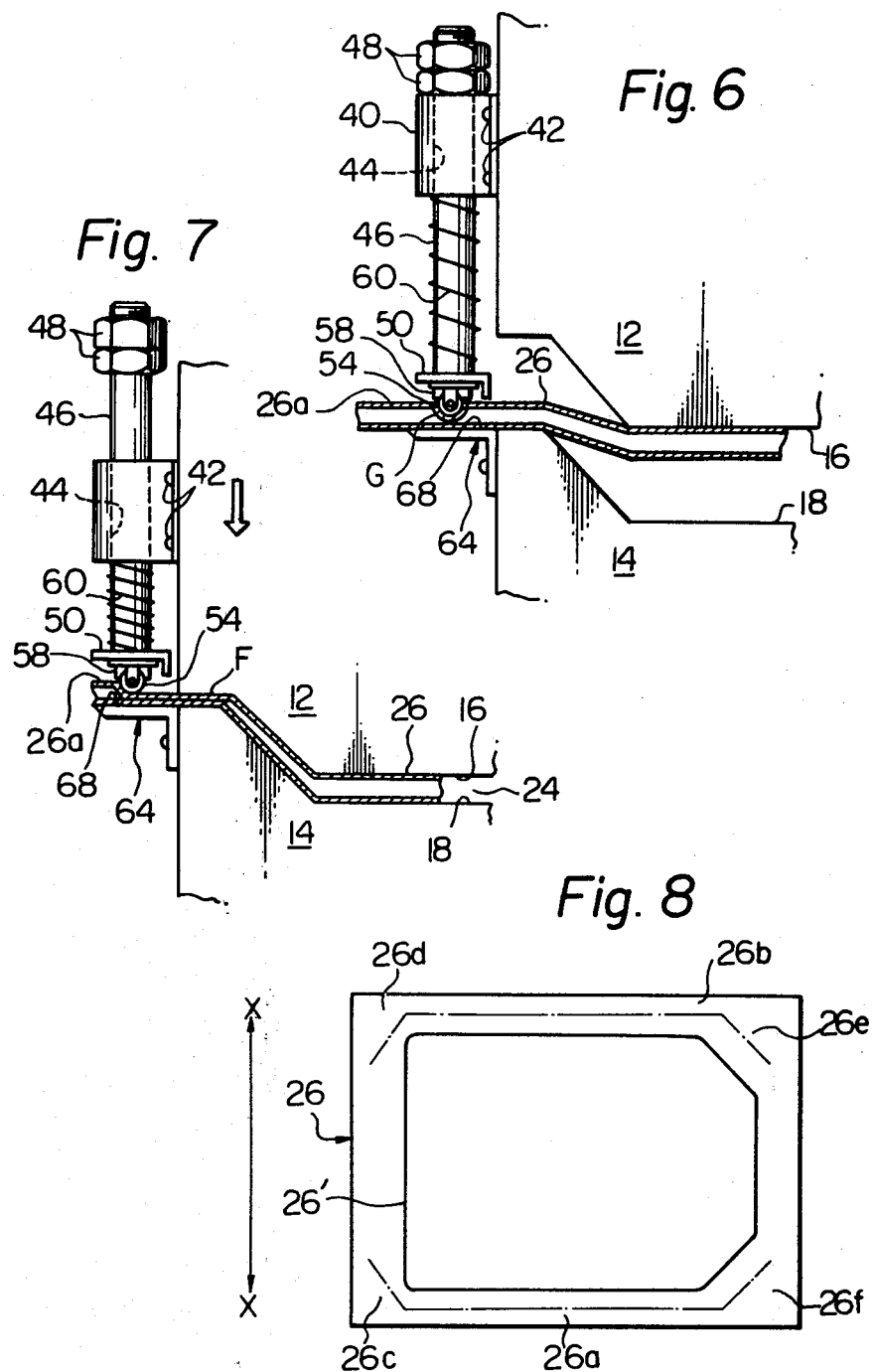

APPARATUS FOR DEFORMING CORRUGATED FIBERBOARD

The present invention relates to an apparatus for inelastically deforming an initially flat blank of a corrugated fiberboard into a configuration at least partially curved in a predetermined direction. While a corrugated fiberboard thus deformed may be used in itself, it will be advantageous to use such a corrugated fiberboard as a basic component of a composite board structure comprising, in addition to the corrugated fiberboard, a facing web of a woven or non-woven fabric or a suitable thermoplastic material such as cellular foams of polyurethane.

A corrugated fiberboard used as the basic component of such a composite board structure includes at least one even-surfaced liner and at least one corrugated paper medium which is bonded at the tops of its ridge portions on one side of the paper medium to one face of the liner. The facing web of a woven or non-woven fabric or a thermoplastic material is bonded over its entire area to the other face of the liner. The adhesive material used to have bonded together the individual component sheet materials to form the composite board structure is preferably of the type which is fusible by heat and set when cooled thereafter.

Composite board structures having such a basic construction are not only useful as ordinary packaging materials to form cartons, boxes and other types of containers but find a wide variety of practical applications where insulation of heat and/or sound and/or dampening out of mechanical vibrations is a serious requirement. The composite board structures have therefore proved useful particularly as interior linings for walls, floors and ceiling panels of residential or office buildings or as facings, trims and interlayers for various structural members of automotive vehicles, ships or boats, and aircrafts, for their stiffness, excellent heat and sound absorbing performances, lightweight constructions and low production and installation costs.

Where corrugated fiberboards are to be utilized for these purposes, it is sometimes necessary to have the fiberboards deformed into configurations which are curved three-dimensionally, viz., not only in directions in which the paper media in the fiberboards are corrugated but in various other directions which are angled to the directions of corrugations of the corrugated paper media. A corrugated fiberboard or a composite board structure consisting of a corrugated fiberboard and a facing web attached to the corrugated fiberboard to be curved is compressed between a pair of die blocks having respective pressing surfaces which are curved conformingly to the desired configuration of a structural member to which the corrugated fiberboard or the composite board structure is to be attached. While a corrugated fiberboard is being thus compressed between such die blocks, heat is applied to the fiberboard usually through the die blocks so as to take up the mechanical stresses and strains produced in those portions of the fiberboard which are being locally curved.

When a corrugated fiberboard is being curved, the fiberboard tends to produce therein a furrow-like or ridge-shaped crease extending in a direction penpendicular to the direction of the corrugation of the corrugated paper medium in the fiberboard due to an excess of thickness which the corrugated paper medium produces in the direction of the corrugation of the paper medium. This is because of the fact that a corrugated fiberboard per se is lacking in flexibility. Production of creases in corrugated fiberboards for use as linings for decorative purposes critically impairs the external appearances and accordingly the total commercial values of the products especially where the corrugated fiberboards are to be used with their creased surfaces exposed to the outside.

One conventional expedient to avoid the production of a crease in a corrugated fiberboard to be curved is to use special blank holders which are fixedly mounted on the die blocks to process the corrugated fiberboard for forcibly clamping the blank of the corrugated fiberboard along its side marginal side portions parallel with the direction of the corrugation of the paper medium of the fiberboard so that the side marginal portions of the blank of the corrugated fiberboard are prevented from being moved in the direction of the corrugation during the operation in which the corrugated fiberboard is being deformed and curved in the particular direction. Such blank holders are, however, effective to prevent the side marginal portions of the blank of the corrugated fiberboard from being moved not only in the direction of the corrugation of the paper medium but in a direction perpendicular to the former and, for this reason, cause the blank to be forcibly stretched between the blank holders in the latter direction when the blank is being deformed. A corrugated fiberboard as a whole being lacking in ductility, this may cause the fiberboard to produce therein, especially in the liner or liners of the board, a fissure in the direction perpendicular to the direction of the corrugation of the paper medium. Production of such a fissure in a corrugated fiberboard also seriously degrades the external appearance and accordingly the total commercial value of the corrugated fiberboard or a product incorporating the fiberboard.

Another expedient of precluding production of a crease in a corrugated fiberboard to be curved is to use movable blank holders which are arranged to be laterally movable toward and away from the die blocks to process the corrugated fiberboard. The blank of the corrugated fiberboard is mounted on the die blocks in such a manner that the side marginal portions of the fiberboard project sidewise outwardly from the die blocks in opposite directions perpendicular to the direction of the corrugation of the paper medium of the fiberboard and are clipped between the movable blank holders on both sides of the die blocks. The blank holders are slowly moved toward the die blocks as the blank of the corrugated fiberboard is being forced to deform between the die blocks so as to allow the side marginal portions of the fiberboard to move inboardly of the die blocks. A drawback of this expedient is that the blank of a corrugated fiberboard to be processed by such an expedient must have a sufficiently large area that can afford to enable the blank to project sidewise outwardly from the die blocks and, as a consequence, a disproportionately great amount of excess material must be wasted. This apparently leads to an increase in the production cost of a curved corrugated fiberboard or a product using such a fiberboard.

The present invention contemplates elimination of the drawbacks inherent in the above described conventional expedients which have thus far been resorted to in preventing production of creases in curved corrugated fiberboards.

It is, accordingly, a prime object of the present invention to provide an apparatus for inelastically deforming an initially flat blank of a corrugated fiberboard into a curved configuration without the risk of producing a crease and a fissure in the fiberboard and at a low production costs.

A general object of the present invention is, thus, to provide an apparatus to process an initially flat blank of a corrugated fiberboard into a corrugated fiberboard which is sightly and economical and which is curved in a predetermined direction.

In accordance with the present invention, these objects are accomplished basically in an apparatus for inelastically deforming an initially flat blank of a corrugated fiberboard into a curved configuration having at least one curved portion with an axis of curvature in a predetermined direction, which apparatus comprises first and second die blocks which have complementarily convex and concave pressing surfaces, respectively, and which are movable relative to each other for forming a predetermined clearance between the pressing surfaces thereof when the die blocks are moved into predetermined relative positions to each other, heating means for heating the die blocks when actuated, and blank retaining means comprising a rigid, substantially straight pressing member extending substantially in parallel with the aforesaid predetermined direction and supported on and movable with one of the first and second die blocks, the pressing member having a substantially semicylindrical portion having a crown extending throughout the length of the pressing member and protruding in a direction substantially parallel with the direction in which the first and second die blocks are movable toward and away from the above-mentioned relative positions thereof, the pressing member being movable relative to the die block supporting the pressing member in the direction substantially parallel with the direction in which the die blocks are movable relative to each other, and an elongated bracket extending substantially in parallel with the pressing member, stationary relative to the other of the first and second die blocks and having a surface portion opposed to and spaced apart from the above-mentioned crown of the pressing member in the direction in which the die blocks are movable relative to each other, the pressing member and the elongated bracket being operative to have a marginal portion of a blank of a corrugated fiberboard clamped and locally collapsed or flattened out between the crown of the pressing member and the aforesaid surface portion of the bracket while allowing the marginal portion of the blank to move in a direction perpendicular to the aforesaid predetermined direction when the die blocks are moved into the aforesaid relative positions thereof with the blank of the corrugated fiberboard clamped between the respective pressing surfaces of the die blocks and forcing the marginal portion of the blank to move inboardly of the aforesaid clearance between the respective pressing surfaces of the die blocks. The above-mentioned surface portion of the elongated bracket may be substantially flat or may be arcuately curved toward the pressing member. Furthermore, the bracket may be securely mounted on a side wall portion of the die block to which the bracket is held stationary. As an alternative, the bracket may form part of a side wall portion of the die block relative to which the bracket is held stationary. The apparatus as a whole may further comprise biasing means urging the pressing member to move toward the aforesaid surface portion of the bracket relative to the die block supporting the pressing member.

The features and advantages of an apparatus according to the present invention will be understood more clearly from the following description taken in conjunction with the accompanying drawings in which:

FIG. 6 is a fragmentary side elevation view showing the condition in which the blank retaining means illustrated in FIGS. 2 to 4 is operative at an early stage of the process in which the apparatus of FIG. 1 is in operation;

FIG. 7 is a view similar to FIG. 6 but shows the condition in which the blank retaining means of FIGS. 2 to 4 is operative at a stage immediately prior to the end of the operation of the apparatus illustrated in FIG. 1; and FIG. 8 is a plan view of an example of a blank of a corrugated fiberboard which is processed by the apparatus embodying the present invention.

Figure 1:
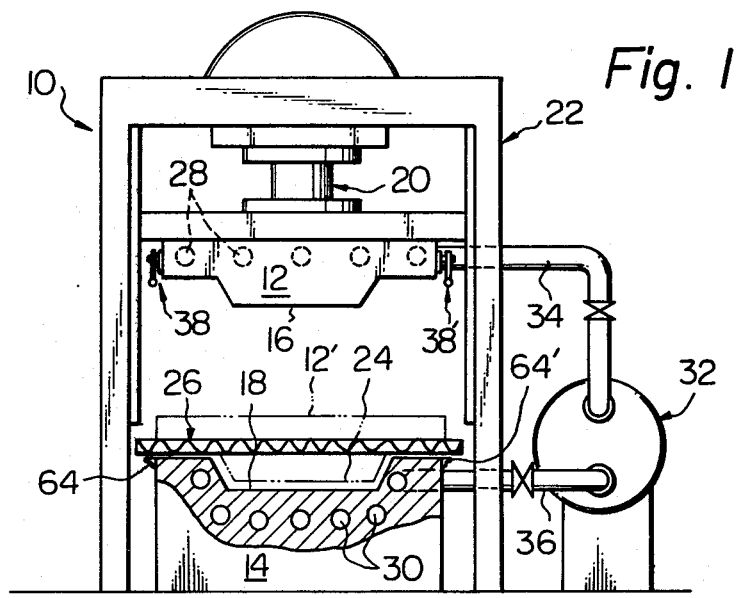
FIG. 1 is a front elevation view showing, partially in vertical section, an overall construction of a preferred embodiment of an apparatus according to the present invention.

Referring to FIG. 1 of the drawings, an apparatus embodying the present invention is shown comprising a down-stroke type hydraulic hot-press 10 having first and second or upper and lower die blocks 12 and 14 having complementarily convex and concave lower and upper pressing surfaces 16 and 18, respectively. Each of the die blocks 12 and 14 has opposite side wall portions each having a substantially flat, horizontal surface which forms part of the lower convex pressing surface 16 of the upper die block 12 or the upper concave pressing surface 18 of the lower die block 14, such a flat, horizontal surface defining the upper end of each of the pressing surfaces 16 and 18. The upper die block 12 is supported by the plunger of a hydraulic cylinder 20 which is mounted on a top cross member of a frame structure 22 so that the die block 12 is vertically movable toward and away from the lower die block 14 which is held stationary. The upper movable die block 12 and the hydraulic cylinder 20 are arranged in such a manner that a certain clearance 24 is formed between the lower convex pressing surface 16 of the die block 12 and the upper concave pressing surface 18 of the lower stationary die block 16 when the upper movable die block 12 is moved by the hydraulic cylinder 20 into a predetermined lowermost position above the upper concave pressing surface 18 of the lower stationary die block 14, as indicated by phantom lines. The clearance 24 which is to be formed between the respective pressing surfaces 16 and 18 of the die blocks 12 and 14 in this fashion is so shaped and sized to conform to the desired configuration and thickness of the corrugated fiberboard to be obtained from an initially flat blank 26. Thus, the respective convex and concave pressing surfaces 16 and 18 are shaped conformingly to the desired curved configuration of the corrugated fiberboard to be produced from the blank 26.

The upper movable and lower stationary die blocks 12 and 14 are formed with nestings of hot-fluid circulating passageways 28 and 30, respectively. The passageways 28 and 30 are communicable with a suitable source 32 of a hot fluid such as boiled oil or water steam through valved pipes or ducts 34 and 36, respectively. The pipe 34 leading to the hot-fluid circulating passageway 28 in the upper movable die block 12 is arranged to be at least partially movable or deformable relative to the hot-fluid source 32 so as to enable the die block 12 to move relative to the hot-fluid source 32 which is held stationary.

In operation, the initially flat blank 26 of a corrugated fiberboard to be curved is placed substantially horizontally on the uppermost flat ends of the lower stationary die block 14, forming a cavity between the underside of the blank 26 and the upper concave pressing surface 18 of the die block 14. The die blocks 12 and 14 are kept heated by the hot fluid which is circulated through the respective hot-fluid circulating passageways 28 and 30 in the die blocks 12 and 14 from the hot-fluid source 32. The hydraulic cylinder 20 is then actuated to drive the upper movable die block 12 toward the lower stationary die block 14. When the upper movable die block 12 thus moved downwardly over the blank 26 of the corrugated fiberboard is brought at the lower end of its convex pressing surfaces 16 with the upper face of the blank 26, the blank 26 is depressed downwardly and is caused to partially warp into the cavity between the upper pressing surface 18 of the lower stationary die block 14 and the lower face of the blank 26. As the blank 26 of the corrugated fiberboard is thus warped deeper into the cavity in the die block 14, the blank 26 is caused to have its side marginal portions urged inboardly between the die blocks 12 and 14. When the upper movable die block 12 reaches the previously mentioned predetermined lowermost position forming the clearance 24 between the lower convex and upper concave pressing surfaces 16 and 18 of the die blocks 12 and 14, respectively, the blank 26 of the corrugated fiberboard is totally clamped between the pressing surfaces 16 and 18 and is deformed into a configuration conforming to the configuration of the clearance 24.

Though not shown in FIG. 1, the blank 26 of the corrugated fiberboard is made up of an even-surfaced liner or liners and at least one corrugated paper medium which is bonded at the tops of its ridge portions to the inner face of the liner or the respective inner faces of the liners usually by a layer or layers of a hot melt adhesive material such as polyethylene which is fusible when heated to a temperature higher than the softening point of adhesive material used. The heat applied to the blank 26 of the corrugated fiberboard from the die blocks 12 and 14 which are being heated by the hot fluid circulated through the respective nestings of the passageways 28 and 30 in the die blocks is transferred to the layer of layers of the hot melt adhesive material in the blank 26 so that the hot melt adhesive material is fused between the ridge portions of the corrugated paper medium and the inner face or faces of the liner or liners when the blank 26 is clamped between the respective pressing surfaces 16 and 18 of the die blocks 12 and 14. The upper movable die block 12 is thereafter moved upwardly by the hydraulic cylinder 20 and the corrugated fiberboard having a curved configuration is allowed or forced to cool. The fused hot melt adhesive in the corrugated fiberboard is thus set and inelastically maintains the deformed configuration of the corrugated fiberboard.

When the upper movable die block 12 is being moved downwardly and has its lower convex pressing surface 16 in pressing contact with the initially flat blank 26 of the corrugated fiberboard and as a consequence the blank 26 is forced to downwardly warp into the cavity between the lower face of the blank and the upper concave pressing surface 18 of the lower stationary die block 14, the opposite side marginal portions of the blank 26 are urged to move inboardly between the respective pressing surfaces 16 and 18 of the die blocks 12 and 14 as previously noted. If, in this instance, the blank 26 of the corrugated fiberboard is positioned to have the corrugation of the corrugated paper medium of the fiberboard oriented in parallel with the side marginal portions of the blank 26, the corrugated paper medium tends to produce an excess of thickness in the direction of the corrugation thereof and as a result the blank 26 of the corrugated fiberboard tends to produce a furrow-like or ridge-shaped crease in the fiberboard in a direction perpendicular to the direction of the corrugation of the corrugated paper medium as pointed out at the outset of the present description. To prevent the production of such a crease in the blank 26 of the corrugated fiberboard to be processed in the above described fashion, the apparatus embodying the present invention as illustrated in FIG. 1 further comprises blank retaining means which is adapted to restrict the sidewise inward movement of the opposite side marginal portions of the blank 26 and to nevertheless allow the marginal portions to move inwardly between the die blocks 12 and 14 so that the blank 26 is prevented from producing not only a crease but a fissure that would otherwise be caused if the blank 26 is forcefully stretched. In the embodiment illustrated in FIG. 1, such blank retaining means is shown to largely comprise a pair of blank pressing units 38 and 38' which are mounted on the opposite side wall portions of the upper movable die block 12. Since the two blank pressing units 38 and 38' are constructed and arranged similarly to each other except in that they are positioned on the different sides of the die block, only the blank pressing unit 38 will be hereinafter described with reference to the drawings.

Figure 2:
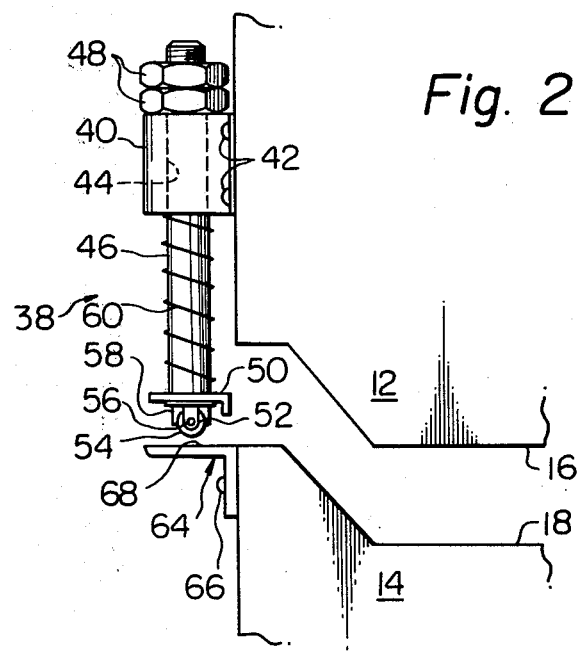
FIG. 2 is a fragmentary front elevation view showing, to an enlarged scale, blank retaining means forming part of the embodiment illustrated in FIG. 1.
Figure 3:
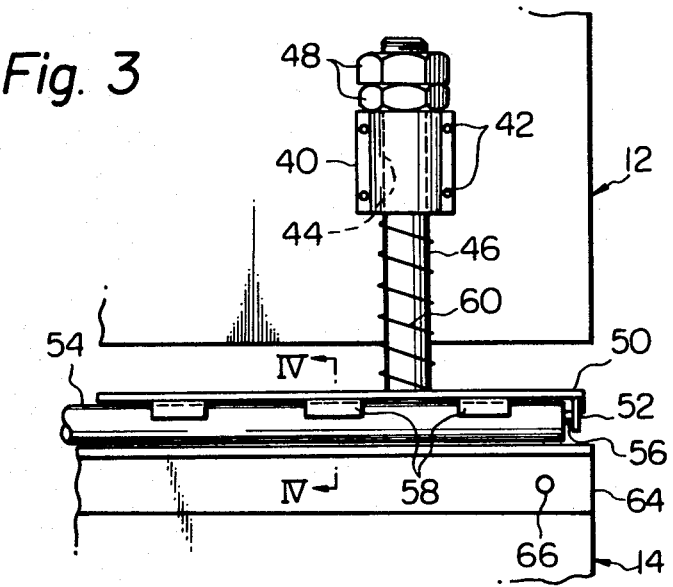
FIG. 3 is a fragmentary side elevation view showing, also to an enlarged scale, the blank retaining means in the embodiment of FIG. 1.

As illustrated in detail and to an enlarged scale in FIGS. 2 and 3, the blank pressing unit 38 comprises a support member 40 which is fixedly mounted on the outer face of the side wall portion of the upper movable die block 12 by suitable fastening means such as bolts or screws 42 and which is formed with a vertical bore 44 which is open at the upper and lower ends of the support member 40 as indicated by broken lines. A rigid, elongated rod 46 is axially movable through the bore 42 in the support member 40 and extends downwardly from the support member 40. The elongated rod 46 has a threaded upper end portion which axially projects out of the upper end of the bore 44 in the support member 40 and with which nuts 48 are held in engagement for preventing the rod 46 from being dropped from the support member 40. The elongated rod 46 and accordingly the support member 40 are located in the vicinity of each of the front and rear ends of the side wall portion of the upper movable die block 12 as will be seen from FIG. 5.

Figure 4:
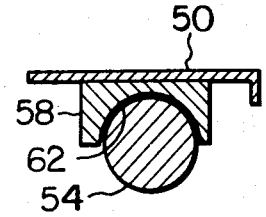
FIG. 4 is a cross sectional view taken on line IV—IV in FIG. 3.

Each of the elongated rods 46 thus mounted on the outer face of the side wall portion of the upper movable die block 12 is connected at its lower end to a horizontal support structure 50 extending substantially in parallel with the above-mentioned outer face of the side wall portion of the die block 12. The support structure 50 has a pair of brackets 52 which are respectively located at the opposite longitudinal ends of the support structure 50, viz., in proximity to the front and rear ends of one side wall portion of the upper movable die block 12 and which project downwardly from the lower face of the support structure 50. An elongated pressing member constituted by a cylindrical roller 54 has its opposite axial end portions rotatably mounted on shafts or pins 56 projecting toward and in line with each other from the brackets 52, respectively, of the support structure 50. The shafts or pins 56 may be replaced with a single elongated shaft (not shown) which axially extends throughout the elongated pressing roller 54 and which is connected at one end to one of the brackets 52 and at the other end to the other bracket 52, though not shown. A plurality of bearing members 58 each having a semicylindrical groove 62 as shown in FIG. 4 are fixedly mounted on the support structure 50 in such a manner that the pressing roller 54 has its upper semicylindrical surface slidable on those inner surfaces of the bearing members 58 which form the semicylindrical grooves 62. The bearing members 58 are located at suitable, preferably regular spacings from each other in a direction substantially parallel with the support structure 50 and the pressing roller 54 as will be seen from FIG. 3. The assembly of the elongated rods 46, support structure 50, pressing roller 54 and bearing members 58 thus constructed and arranged is urged to move downwardly relative to the upper movable die block 12 by suitable biasing means such as preloaded helical compression springs 60 which are respectively associated with the elongated rod 46 at the opposite longitudinal ends of the support structure 50 and each of which is seated at one end on the upper face of the support structure 50 and at the other end on the lower end face of each of the support members 40 on the die block 12. The sizes and positions of the various component parts of the blank pressing unit 38 relative to the die structure 12 are such that the pressing roller 54 is enabled to reach the level of the upper end of the upper concave pressing surface 18 of the lower stationary die block 14 when the elongated rod 46 passed through the support member 40 is moved to its lowermost axial position in the absence of a fiberboard on the die block 14, such a lowermost axial position being dictated by the axial positions of the nuts 48 on the rod 46 and toward which the rod 46 is urged to move by means of the preloaded compression spring 60.

The blank retaining means of the embodiment illustrated in FIG. 1 further comprises a pair of elongated brackets 64 and 64' which are located below and vertically aligned with the blank pressing units 38 and 38', respectively, each of the above described nature and which are held stationary relative to the lower stationary die block 14. The elongated brackets 64 and 64' are also constructed and arranged similarly to each other and, for this reason, description will be herein made in respect of only one bracket 64.

The elongated bracket 64 has a generally L-shaped cross section and is fixedly attached to the outer face of one side wall portion of the lower stationary die block 14 by suitable fastening means such as bolts or screws 66 as shown. The bracket 64 extends horizontally substantially in parallel with the pressing roller 56 of the above described blank pressing unit 38 and has an upper flat surface portion 68 which is spaced apart from the pressing roller 56 and which is substantially flush with the uppermost horizontal flat surface of one side wall portion of the die block 14 as will be clearly seen from FIG. 2.

Figure 5:
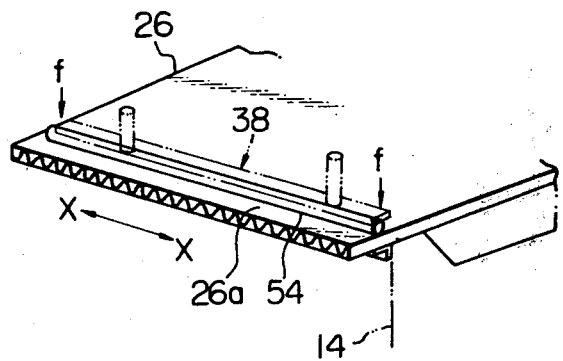
FIG. 5 is a schematic perspective view showing an example of the arrangement in which the apparatus constructed as illustrated in FIGS. 1 to 4 is used to process a corrugated fiberboard.

For operation of the apparatus which has been hereinbefore described with reference to FIGS. 1 to 4, the initially flat blank 26 of a corrugated fiberboard to be processed is positioned on the lower stationary die block 14 in such a manner that the blank 26 has its opposite side marginal portions (one of which is shown at 26a in FIG. 5) received on the respective upper flat faces of the elongated brackets 64 and 64' on the die block 14 and has its paper medium corrugated in a direction substantially parallel with the directions of elongation of the elongated brackets 64 and 64' as indicated by X—X in FIG. 5.

When the upper movable die block 12 which has been held in the raised inoperative position is driven to move downwardly by the hydraulic cylinder 20 (FIG. 1) and as a consequence the initially flat blank 26 of the corrugated fiberboard partially contacted by the lower convex pressing surface 16 of the die block 12 is forced to partially warp into the cavity in the lower stationary die block 14 as previously discussed, the roller 54 of the blank pressing unit 38 is brought into contact at its lower end with the upper face of the side marginal portion 26a of the blank 26 on the upper flat face of the elongated bracket 64 on the lower stationary die block 14. The assembly of the roller 54, support structure 50 and elongated rods 46 of the blank pressing unit 38 is thus moved upwardly relative to the upper movable die block 12 against the force of the compression spring 60 with the result that the side marginal portion 26a of the blank 26 is compressed between the roller 54 and the upper flat surface portion 68 of the elongated bracket 64 on the lower stationary die block 14. As the upper movable die block 12 is further moved downwardly, the compression springs 60 of the blank pressing unit 38 are forced to axially compress and cause the roller 54 to press the side marginal portion 26a of the blank 26 along the elongated lower end of the roller 54. The corrugated paper medium forming an interlayer of the marginal portion 26a of the blank 26 is therefore locally collapsed in the direction X—X of the corrugation of the paper medium and forms in the marginal portion 26a of the blank 26 a furrow-shaped groove G alongside and laterally at a spacing from the side edge of the marginal portion 26a as shown in FIG. 6. Under these conditions, the downward pressing force from the elongated rods 46 and the compression springs 60 being axially compressed is imparted to the roller 54 uniformly through the support structure 50 and the bearing members 58 against which the roller 54 slidably bears over its upper semicylindrical surface. The roller 54 being thus forcibly received in the narrow elongated groove G formed in the side marginal portion 26a of the blank 26, the blank 26 of the corrugated fiberboard is clamped between the roller 54 and the elongated bracket 64 along the narrow elongated groove G, viz., in the direction X—X of the corrugation of the corrugated paper medium in the blank 26 and is prevented from being moved or dislocated in the particular direction X—X relative to the die blocks 12 and 14. Similar effects can be achieved by the other blank pressing unit 38' and elongated bracket 64' which are in conditions clamping the other side marginal portion (indicated by 26b in FIG. 8) of the blank 26 of the corrugated fiberboard.

As the upper movable die block 12 is still further moved downwardly and as consequence the blank 26 of the corrugated fiberboard is forced to partially warp deeper into the cavity in the lower stationary die block 14, the opposite side marginal portions 26a and 26b of the blank 26 are urged to move sidewise inboardly of the die blocks 12 and 14. The marginal portion 26a of the blank 26 thus attempts to drive the roller 54 to turn about its center axis so that the roller 54 is forced to turn about the center axis when the braking forces being applied to the roller 54 from the blank 26 and the compression spring 60 are overcome by the pull applied to the marginal portion 26a from the warped center portion of the blank 26 being deformed between the pressing surfaces 16 and 18 of the die blocks 12 and 14, respectively. The side marginal portion 26a is therefore allowed to slowly slide sidewise inwardly on the upper flat surface portion 68 of the elongated bracket 68 on the lower stationary die block 14 and at the same time the roller 54 is allowed to slowly turn about its center axis and roll on the upper face of the marginal portion 26a in a direction to further collapse the internal corrugated paper medium in the marginal portion 26a toward the side edge of the portion 26a. The side marginal portion 26a of the blank 26 is in this fashion slowly flattened out toward the side edge of the marginal portion 26a as indicated by F in FIG. 7 as the upper movable die block 12 is being moved toward the position forming the predetermined clearance 24 between the respective pressing surfaces 16 and 18 of the die blocks 12 and 14. The other side marginal portion 26b (FIG. 8) of the blank 26 is similarly flattened out by the blank pressing unit 38' and the bracket 64'.

Thus, the blank 26 of the fiberboard is restrained from being moved in the direction X—X of the corrugation of the corrugated paper medium in the blank 26 throughout the operation to process the blank 26 to be deformed and curved in the particular direction and is therefore prevented from producing creases in directions perpendicular to the direction X—X in which the blank 26 is curved. Because, furthermore, of the fact that the blank 26 thus restrained from being moved in the direction X—X is nevertheless allowed to move in the direction perpendicular to the particular direction X—X, the blank 26 being forced to warp is prevented from being excess-stretched between the opposite side marginal portions of the blank so that there is substantially no risk that the blank 26 would produce fissures therein.

If desired, the roller 54 of the blank pressing unit 38 or its counterpart of the blank pressing unit 38' may be replaced with any other form of pressing member provided the member has a substantially semicylindrical portion extending throughout the length of the pressing member and having a crown protruding downwardly. If such a pressing member is configured to be semicylindrical in its entirety, the particular member may be fixedly mounted on or integrally formed with the support structure 50. In this instance, the side marginal portion of the blank 26 clamped between the crown of the semicylindrical pressing member and the elongated bracket 64 or 64' on the lower stationary die block 14 is caused to slide not only on the upper flat surface portion of the bracket but on the crown of the semicylindrical pressing member. Furthermore, the elongated brackets 64 and 64' may be formed as integral portions of the lower stationary die block 14 if the die block 14 is so sized that the side walls thereof can afford to form such portions. While each of the brackets 64 and 64' has been assumed to have a flat upper face, each bracket may be modified to have an curved upper face which is protruded upwardly.

The blank retaining means of the apparatus embodying the present invention has been arranged to be capable of clamping only the opposite side marginal portions 26a and 26b of the blank 26 in directions parallel to the direction X—X of the corrugation of the corrugated paper medium in the blank 26 but, if desired, such means may be used to clamp not only these marginal portions 26a and 26b but some or all of the corner portions 26c, 26d, 26e and 26f of the blank 26 as shown in FIG. 8. From the blank 26 of the fiberboard thus processed, a final product having a predetermined external contour as indicated by 26' in FIG. 8 is cut out to remove the remaining marginal portions which have been partially flattened out.

For the purpose of enhancing the advantages achieved by the present invention, the die blocks 12 and 14 for use with the blank retaining means provided by the present invention may be so shaped that the clearance 24 to be formed between the respective pressing surfaces 16 and 18 of the die blocks 12 and 14 has an increased thickness in its sharply curved portion thereby to more assuredly prevent production of creases in the blank of the corrugated fiberboard.

What is claimed is:

1. An apparatus for inelastically deforming an initially flat blank of a corrugated fiberboard into a curved configuration, said configuration having at least one curved portion with an axis of curvature in a predetermined direction, comprising first and second die blocks which have complementarily convex and concave pressing surfaces, respectively, and which are movable relative to one another for forming a predetermined clearance between said pressing surfaces when the die blocks are moved into predetermined relative positions, heating means for heating said die blocks when actuated, and blank retaining means comprising (i) a rigid, substantially straight elongated pressing member extending substantially in parallel with said predetermined direction throughout the length of the pressing member and supported on and movable with one of the first and second die blocks, the pressing member having a substantially semicylindrical portion with a crown extending throughout the length of the pressing member and protruding in a direction substantially parallel with the direction in which said first and second die blocks are movable toward said relative positions, the pressing member being movable relative to the die block supporting the pressing member in said direction substantially parallel with the direction in which the die blocks are movable relative to one another, and (ii) an elongated bracket extending substantially in parallel with said pressing member, stationary relative to the other of said die blocks and having a surface portion opposed to and spaced apart from said crown in the direction in which the die blocks are movable relative to one another, said pressing member and said bracket being operative to have a marginal portion of a blank of a corrugated fiberboard clamped and locally collapsed between said crown of the pressing member and said surface portion of the bracket while allowing the marginal portion to move in a direction perpendicular to said predetermined direction when said die blocks are in said relative positions with the blank of the corrugated fiberboard clamped between the respective pressing surfaces of the die blocks and forcing said marginal portion to move inboardly of said clearance.

2. An apparatus as set forth in claim 1, in which said blank retaining means further comprises biasing means urging said pressing member to move toward said surface portion of said bracket relative to the die block supporting the pressing member.

3. An apparatus as set forth in claim 2, in which said pressing member consists of a cylindrical roller which has a center axis substantially parallel with said predetermined direction and which is rotatable about said center axis, said roller forming said crown at its circumferential surface portion which is directed toward said surface portion of said bracket.

4. An apparatus as set forth in claim 3, in which said blank retaining means further comprises a plurality of bearing members which are spaced apart from each other in a direction substantially parallel with said center axis of said roller and which are movable with the pressing member in said direction substantially parallel with the direction in which said first and second die blocks are movable relative to each other, said bearing members being in slidable contact with said roller along a circumferential surface portion of said roller which is diametrically opposed to the circumferential surface portion forming said crown, and said biasing means being further operative to urge said bearing members against said roller in a sense in which the roller is urged to move by the biasing means.

5. An apparatus as set forth in claim 4, in which said blank retaining means further comprises a support member which is fast on a side wall portion of the die block supporting said roller, and an elongated rod connected to said bearing members and extending substantially perpendicularly from said center axis of the roller away from said surface portion of said bracket and axially slidably received in said support member.

6. An apparatus as set forth in claim 5, in which said blank retaining means further comprises a support structure extending substantially in parallel with the center axis of said roller throughout the length of the roller, securely connected to said elongated rod and said bearing members and supporting a shaft on which said roller is rotatable about the center axis thereof.

7. An apparatus as set forth in claim 6, in which said biasing means comprises a preloaded helical compression spring which is seated at one end on said support member and at the other end on said support structure.

8. An apparatus as set forth in claim 1, in which said surface portion of said bracket is substantially flat.

9. An apparatus as set forth in claim 1, in which said surface portion of said bracket is arcuately curved toward said pressing member.

10. An apparatus as set forth in claim 1, in which said bracket is securely mounted on a side wall portion of the die block relative to which the bracket is stationary.

11. An apparatus as set forth in claim 1, in which said bracket forms part of a side wall portion of the die block relative to which the bracket is stationary.

* * * * *